June 3, 1952 S. S. HELD 2,598,912
MOVEMENT FOR ELECTRIC TIMEPIECES
Filed June 11, 1949 5 Sheets-Sheet 1

INVENTOR:
SIMON SERGE HELD
By:
Haseltine, Lake & Co.
AGENTS

June 3, 1952  S. S. HELD  2,598,912
MOVEMENT FOR ELECTRIC TIMEPIECES
Filed June 11, 1949  5 Sheets-Sheet 4

INVENTOR:
SIMON SERGE HELD
By:
Haseltine, Lake & Co.
AGENTS

UNITED STATES PATENT OFFICE 2,598,912

MOVEMENT FOR ELECTRIC TIMEPIECES

Simon Serge Held, Paris, France, assignor of one-half to Etablissements Ed. Jaeger, Levallois-Perret, France, a company Application June 11, 1949, Serial No. 98,579
In France June 23, 1948

31 Claims. (Cl. 318—129)

The present invention relates to improvements effected in direct driven electric time pieces and especially to their electric circuits periodically switched off.

Devices have already been designed, in clock and watch-making wherein an armature associated with the balance wheel is moving in a reciprocating motion in the field of an electro-magnet under the action of impulses generated by currents flowing periodically through the winding of said electro-magnet. The sparks, however, due chiefly to the transient excess current caused by the cutting off of the electro-magnet, inevitably damage the make and break contacts. In practice, great difficulties are experienced in obtaining reliable contacts with a long life. Further, the remanent magnetism and hysteresis which are present, even in the best irons, may give rise to errors for some precision apparatus.

Electro-magnets are commonly used, associated with a moving part consisting of a soft iron armature. The fixed part is made of soft iron and wound. The principle in itself requires a flux variation inside the iron and the energy stored in the iron is dissipated in sparks. Sparks may be absorbed partly in resistances, short circuited turns, capacities, etc. but always at the expense of the spent energy supplied by the source. The current consumption not being negligible, the use of such devices requires current sources having an important output and excludes their utilization in certain cases where lightness is a primary consideration.

It has also been imagined to create an important fixed field, by means of a magnet or an electro-magnet, inside which a coil is displaced. This is the basic principle of all D. C. galvanometers. The fixed field is not cut off and the self-inductance is reduced to that of the frame which is very small if no iron is located inside. With the usual soft iron cores, there is a slight self-inductance and a small flux variation inside the frame whenever the current is switched on or off. Therefore a small spark is caused.

With a view to provide a remedy to the various above mentioned drawbacks, the main object of the invention is an electric time piece wherein the inductive energy of the core is suppressed and, consequently, the sparks due to transient currents resulting therefrom.

According to another object of the invention the magnetic parts generating the field are fixed so that any directional effect due to the earth field is eliminated.

To obtain such results, a magnetic circuit is set up, with a small air gap comprising a special core so chosen as to be free from inductive effect and surrounded by a moving coil, all magnetic parts being stationary. The magnetic circuit is such that the flux through it undergoes practically no variation when a current flows through the coil or when the current is cut off. In other words, the ampere-turns of this coil are subjected to the powerful motive action of the field of the magnetic circuit but do not cause said field to vary in any appreciable manner.

Another object of the invention is to eliminate any disturbing action on the moving part over the whole amplitude of its run, whether due to remanent magnetization, hysteresis, eddy currents, etc. The field being generated by stationary parts, the latter may be fairly bulky, hence a very powerful field and a small consumption in the winding, which allows the utilization of current sources having a small capacity, such as dry cells, for example.

According to one type of embodiment, the periodically cut-off electric circuit comprises a copper wire winding driven, under the action of impulses generated by a current passing periodically therethrough, inside a magnetic circuit with a strong magnetic field comprising one or several permanent magnets associated with a core which consists of one or more permanent magnets or one or more parts of special iron, completely saturated by the magnetic field of said magnets. Thus the spark is practically reduced to zero, since the flux going through the coil has almost no variation. Thus, if a magnet and saturated core is constituted for the magnet field, this core no longer behaves as a soft iron core and as regards the spark the coil behaves as if it were in air, without any iron. Thus the switching off acts on a resistance since the time constant $L/R$ is almost zero. As regards the fixed field, however, the core at the threshold of saturation makes it possible to obtain inside the air gap a field which is almost as intense as with a soft iron core.

If an all-magnet circuit is set up, the special iron of the magnet, being very hard, behaves with respect to the winding as if said winding did not comprise any magnetic circuit. The lines of force of the winding do not increase material the fixed field going through it. There will be, for instance, 1000 Gauss in the air gap with the winding switched off and one additional Gauss with the winding switched on, while the variation would be more important with a soft iron core.

The device may comprise one or more permanent magnets, a permanent magnet core or a saturated iron core on the axis of the balance wheel, and a winding associated with said balance wheel to pivot about its axis inside the air gaps of said magnets. The obtention of a motive torque by means of a coil and magnet, one or the other being a moving element is already known in itself, but the magnets considered are open circuit magnets the lines of force of which close in air. In the present case, this means is suitable for large scale circular oscillations of a copper wire winding placed in a magnetic circuit having a strong magnetic field and a small air gap, and consequently high torques are applied to said winding by means of very small currents. This arrangement differs from the usual arrangements of galvanometers using a moving coil and a soft iron core in the sense that the inductive effect of the soft iron core is eliminated, which, with the coil, would form a small self-inductance capable however of giving bad contacts in the long run.

The coil movable inside the air gap of the permanent magnet may consist of a reduced number of turns or of very fine wire since the current flowing through it has a very small value.

Clocks with balance wheels have been built, with a moving coil in the fixed field of a magnet. The circuit of the magnet, however, is open and the lines of force close in air.

The coil does not rotate about an axis, it is heavy and bulky and is only suitable for a mantel piece clock. The electric watch, according to the invention, is a special ballistic galvanometer adapted to clockmaking by eliminating the contact sparks.

The field generating elements, magnet and core, can be interchanged, the magnet being placed inside the coil and field closure plates being provided outside said coil.

The clock may comprise, further, a device for adjusting the amplitude of the balance wheel oscillations by acting on the potential difference existing in the periodically switched off circuit, said device comprising an adjustment rheostat inserted in said circuit, rheostat whose moving element is controlled from outside the watch, and an indicator used for determining visually the amplitude of the oscillations as a function of the adjustment of said rheostat.

The following description, read in connection with the appended drawings, given by way of non-limitative examples, will make it possible to understand immediately the features of the invention and the mode of operation of the time pieces manufactured in accordance with said invention. In the drawings.

The various realizations shown relate to improvements for the direct driving of small electric time pieces and watches, by a D. C. source, especially for those time pieces and watches having a clock work movement with a drive spiral balance wheel. With a view to shortening the description of said realisations, the figures have been limited to the essential parts of the invention, while omitting the constructional details of the movement transmission to the hands by the balance wheel, constructional details which are already known per se.

Generally, and with a view to allowing the application of the principle of the invention, the electric watch according to the invention consists, in its essential part, of a coil movable in a magnetic field which is created by a permanent magnet with a small air gap, the fixed core of which is constituted either by a permanent magnet or by an iron piece saturated by the magnetic field of the magnet. The moving coil, having a moment of inertia I is subjected to the return torque C of a spiral spring, in such a manner that the period of the oscillations $$T = 2\pi \sqrt{\frac{I}{C}}$$

corresponds to a predetermined value. The whole is fairly similar to a ballistic galvanometer but differs therefrom by the nature of the core. The frame is weighted by one or more slugs arranged so as to obtain a maximum moment of inertia with a minimum weight. This weight consists, preferably, of a flat metal washer placed outside of the magnetic field, to avoid damping, or of a non metallic washer.

The ordinary spiral spring is used as a lead for the current, the other terminal being the body itself. To obtain this second lead, it is preferable to arrange a second spiral spring which may complete the first one or a small piece of foil wound into a spiral but without any substantial mechanical torque.

Figure 15:
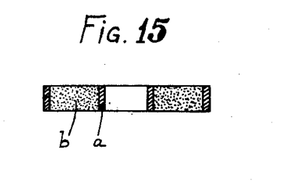
Figure 15 is a cross-section of a composite permanent magnet.

The magnet or magnets have a large coercive force, and are of the iron-nickel-aluminum type or other alloy, preferably of agglomerated powder, so as to make it possible to give easily the desired shape to the parts. In case agglomerated powders are used, the magnet may comprise as illustrated in Fig. 15 a non-magnetic metal armature $a$ constituting the supporting framework for the powdered agglomerated material $b$. If the magnetic circuit comprises a saturable iron core, an alloy of the $\mu$-metal type or of the Permalloy type will be used preferably, such that the saturation be obtained only with the maximum field of the magnets, so that the flux within the air gap be not substantially lower than the one which would be obtained with an ordinary soft iron core.

Figures 1 to 6 represent a first class of embodiments of "all magnets" magnetic circuits wherein the maximum possible torque has not been aimed at, but rather an economical construction. The inner and outer portions of the magnetic circuit with respect to the coil are separate.

Figure 1:
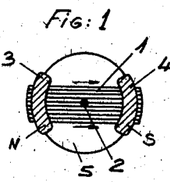
Figure 1 is a schematic plan view of an electric movement formed by two permanent magnets and a core of saturated iron, with uniformally directed magnetic flux.

In Figure 1, the moving coil 1 of the balance wheel pivots about the axis 2 inside the air gap of an outer magnet the poles of which are represented at 3 and 4 and the core at 5. It will be noted that as the driving torque exists only for a very small angle of amplitude, at the time of the contact at zero, the field is not distributed uniformly over the whole periphery as in the case of an ordinary galvanometer, but concentrated in the useful region.

Figure 2:
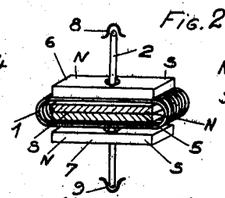
Figures 2 and 3 are respectively schematic perspective and sectional views of an electric movement formed by two permanent magnets and a core made of permanent magnets, with uniformally directed magnetic flux.
Figure 3:
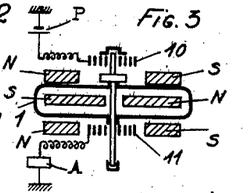

Figure 2, of which Figure 3 is a section, shows, in perspective a realization wherein two magnetized bars 6 and 7 located respectively above and beneath the moving coil 1 are parts of the magnetic circuit closed by the inner magnet 5, the polarities of the magnetized bars 6, 5 and 7 being successively reversed. The pin 2 of the balance wheel is supported by thrust bearings 8 and 9 and is associated with the coil 1. The device comprises two spiral springs 10 and 11 ensuring the current supply to the frame 1 from a cell P connected with the earth by means of an impulse generating device A. The generating device A is of any one of the types disclosed in Figs. 11 to 14 and 16 to 27 to be hereinafter described. The devices disclosed by those figures have one or more blades put alternately in engagement with changeover contacts.

Figure 4:
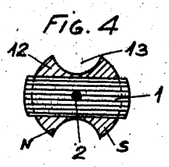
Figure 4 is a schematic plan view of an electric movement with special core and with uniformally directed magnetic flux.

Figure 4 shows a variant wherein the core 12 is provided with notches 13.

Figure 5:
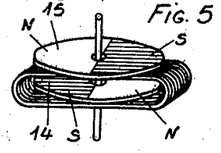
Figure 5 is a schematic perspective view of an electric movement having circular permanent magnets as field generator and core, with uniformally directed magnetic flux.

In Figure 5, the core 14 and the outer magnet 15 are constituted by washers magnetized north and south on both sides of a diametral line.

Figure 6:
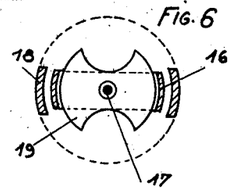
Figure 6 is a schematic cross-section of a cylindrical electric movement similar to the movement illustrated in Fig. 1.

Figure 6 shows an adaptation of the device illustrated in the previous figures to the case of a clock designed to have the shape of a cylinder of a small diameter, relative elongated. The coil 16 can move about the axis 17 within the air gap of the cylindrical magnet 18 comprising a cylindrical core 19.

Figures 7 to 10 represent realizations wherein, in an effort to obtain the maximum possible torque, one has been led to realizing the parts inside and outside the coil by means of one magnet, either by halves or intotality.

Figure 7:
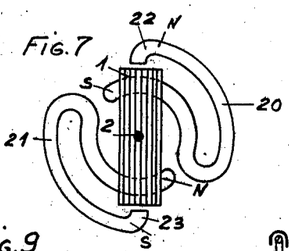
Figure 7 is a schematic plan view of an electric movement formed by two circularly U-shaped permanent magnets one part of which is located inside the winding, the magnetic flux remaining uniformally directed.

In the realization shown in Figure 7, the coil 1, movable about the axis 2 moves inside the air gap of two magnets 20 and 21, having a closed magnetic circuit, the two opposite poles of which are located inside the coil. The two other poles of each one of said magnets may be provided with pole pieces 22 and 23 the position of which corresponds to the position of equilibrium at which the impulse is supplied to the coil 1. This pole piece might be located in the middle portion of elements 20 and 21, in order to obtain symmetrical impulses.

Figure 8:
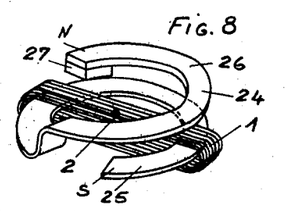
Figure 8 is a schematic perspective view of an electric movement formed by a helically shaped permanent magnet one portion of which is surrounded by the winding, the magnetic flux remaining uniformally directed.

In Figure 8, the coil 1, movable about the axis 2, is comprised inside the air gap of a single magnet 24 having the shape of a double half helix, whose lower part 25 is inside the coil 1 and whose upper part 26 is outside said coil. This latter part is provided with a pole piece 27.

Figure 9:
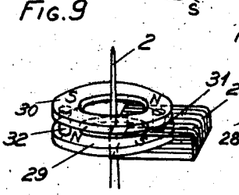
Figures 9 and 10 are schematic perspective views of electric movements formed by annular permanent magnets, respectively different and integral, one of said magnets being surrounded by the winding, the magnetic flux remaining uniformally directed.

In the realization shown in Figure 9, one of the sides of the coil 28 goes through the axis of rotation 2. A ring-shaped magnet 29 goes through it and forms a magnetic circuit with the magnet 30 outside the coil, this latter magnet carrying a pole piece 31. The magnets 29 and 30 are connected by a connecting element 32.

Figures 10, 11:
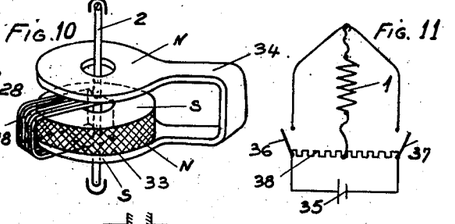
Figures 11 and 12 are schematic electrical supplying diagrams for movements the magnetic flux of which remains uniformally directed, said diagrams respectively having an equipotential connection for the winding with a rheostat and with the current source.

In Figure 10, the coil 28, one side of which goes through the oscillation axis 2, comprises inside it a core 33, made of a magnet, cooperating with a U-shaped magnet 34, the inner flange of which goes through the coil and the upper flange of which is located above said coil. The core 33 might just as well consist of a piece of saturated iron.

The realizations shown in Figures 9 and 10 correspond to arrangements having a wide amplitude of deviation.

The various types of realization shown in Figures 1 to 10 are adapted to a method of supply according to which the moving coil receives, when passing through the equilibrium position, or zero position, two impulses in opposite directions, from two currents of different polarities, or receives only one pulse, in one direction only, so as not to hinder the oscillations of the balance wheel. In all cases, the magnetic circuit is simple, with a one-way flux. Figures 11 to 14 illustrate diagrams for electric sets up corresponding to these modes of supply, which comprise the impulse generating means A of Fig. 3.

In the diagram in Figure 11, the coil 1 is supplied from a current source 35 by means of two contacts 36 and 37 operated by the balance wheel. The resistance 38, with a middle tap, makes it possible to obtain the current reversal by means of two contacts only.

Figure 12:
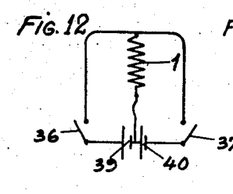

Figure 12 shows a diagram similar to that of Figure 11, wherein two current sources 39 and 40, mounted in series, comprise an equipotential tap for supplying the coil 1 through switches 36 and 37, so as to avoid any permanent consumption of energy in a resistance and to allow the current reversal in the coil, which would ordinarily require four contacts. Since each battery discharges in turn, each one of them may be smaller, the volume, weight and life being the same as with one battery.

Figure 13:
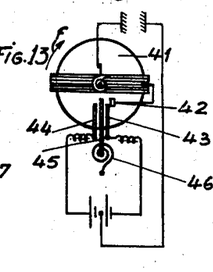
Figure 13 is a schematic diagram similar to that of Fig. 12 having a contact element formed by an oscillatable insulating plate supporting on each side contacts connected with the poles of the current source.

Figure 13 shows a realization of a two contact device derived from the one illustrated in Figure 12. The balance wheel 41 carries a pin 42 which acts on contacts consisting of precious metal blades 43 and 44 separated by a very thin insulating plate 45 protruding positively from the contacts 43 and 44. When the balance wheel moves in the direction of the arrow f, the pin 42 comes in contact with the blade 43; the assembly of the blades 43, 44 and 45 bends to let the pin 42 escape. The impulse is supplied to the coil at the time of contact of said pin with the blade 43. The holding spring of contacts 46 calls back the insulating blade 45 to its normal position. When the pin 42 comes back in the reverse direction, at the time when the balance wheel moves in an opposite direction to the arrow f, it meets the conducting plate 44, whence a new impulse in the coil by a current having a reversed polarity. The blades 43 and 44 may, preferably, be attached to the insulating plate 45 and are thus automatically brought back to the equilibrium position by the holding spring 46.

Figure 14:
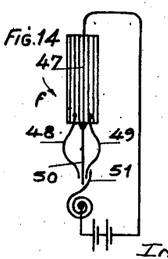
Figure 14 is a schematic electrical supplying diagram for a movement the magnetic flux of which remains uniformally directed, the winding being formed by two reversely wound half windings.

In the realization shown in Figure 14, the coil 47 is formed by two oppositely wound windings or comprises a mid point, the leads being brought out to two contact blades 48 and 49 separated by an insulating plate 50. When the coil moves in the direction of the arrow f, the blade 49 meets the movable contact 51, connected with the current source, and thus generates the impulse in said coil 47, then the blades 48 and 49 escape the movable contact 51 without causing a short circuit, due to the presence of the insulating plate 50. When the coil comes back in the opposite direction, the impulse is supplied to it by the meeting of the blade 46 with the movable contact 51.

Figure 16:
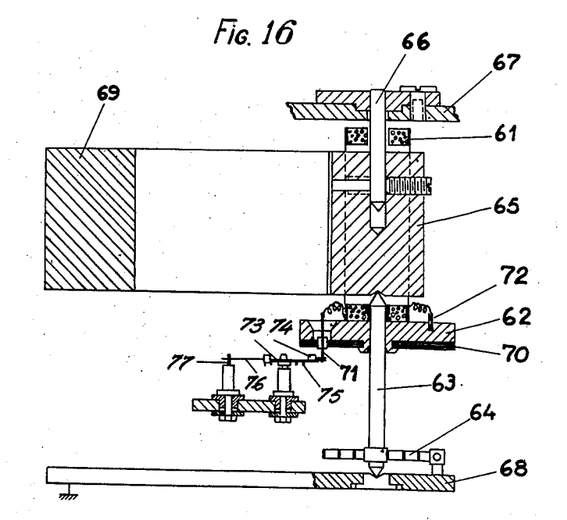
Figures 16 and 17 are respectively an elevational and partially section view and a plan view of an electric watch according to the invention, the oscillations of which are controlled by two impulses in opposite directions.
Figure 17:
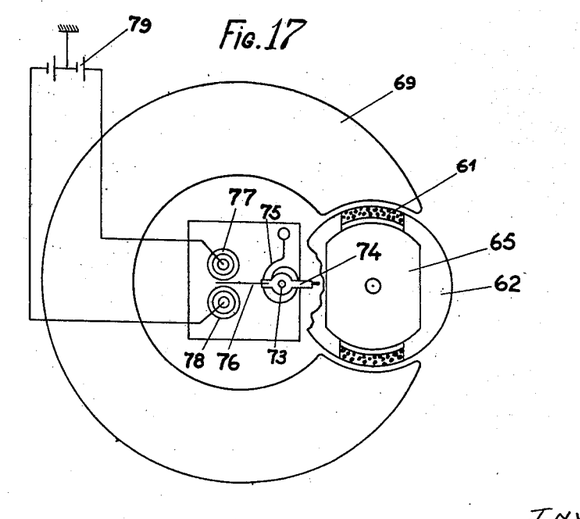

The clock shown in Figures 16 and 17 comprises a coil 61 of copper wire and assembled with the balance wheel 62 on the pin 63 of the balance wheel. The latter pivots, on the one hand, on the saturated iron core 65, carried by the bridge 67, through a fixed pin 66 and, on the other hand, on the watch plate 68. The period of oscillation of the balance wheel 62 is adjusted by the spiral spring 64. The magnetic field of the permanent magnet 69 is closed in the core 65.

On the balance wheel 62 is enchased an insulating disc 70 which carries a contact pin 71, to which is soldered one end of the winding 61, the other end of said winding being soldered on the pin 72, non-insulated, mounted on the balance wheel 62.

The pin 71 acts on a triggering contact 73, through a finger 74, attached to one end of this triggering contact. On the other hand the latter has a position determined by the return spiral spring 75. It ends, further, opposite the finger 74, into a flexible tail piece 76 which, owing to the driving of the finger 74 by the pin 71 at each oscillation of the balance wheel, contacts alternately the contact points 77 and 78. These contact points are connected to a current source 79, preferably a dry cell, the mid point of which is connected to the clock plate 68. The reversal of the impulse current is thus effected at each passage of the balance wheel through its position of equilibrium. For this, the contact points 77 and 78 must be brought as close as possible to each other and the finger 74 must be given a fairly important thickness, so that the impulse contact be established at the time when the balance wheel goes through its position of equilibrium.

Figures 18, 19:
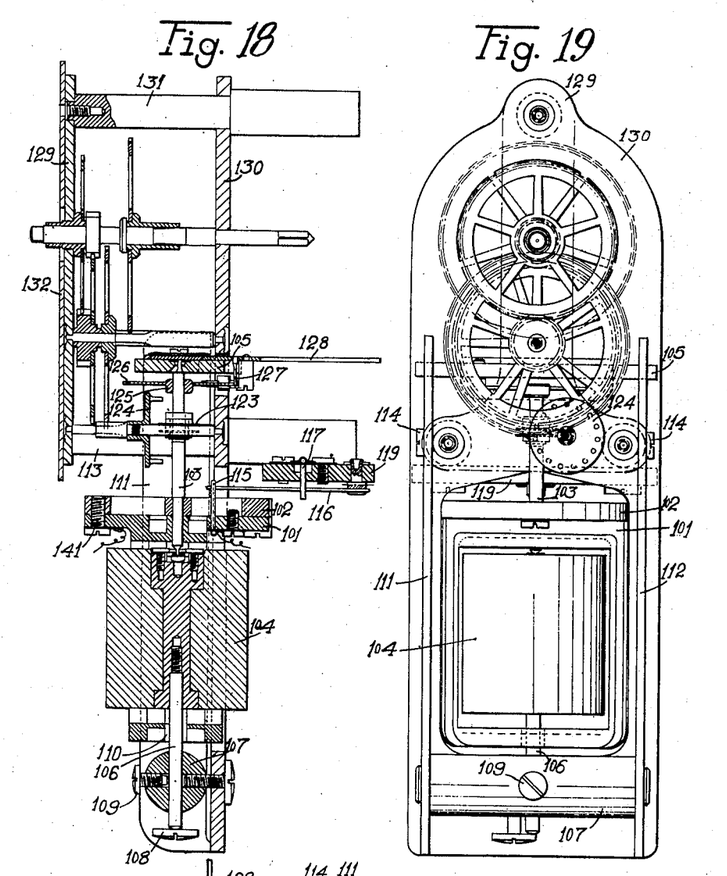
Figure 18 is an axial sectional view of a variant of the direct driven electric watch, illustrated in Figures 16 and 17.
Figure 19 is a side view along line XXII—XXII of Fig. 18.
Figure 20:
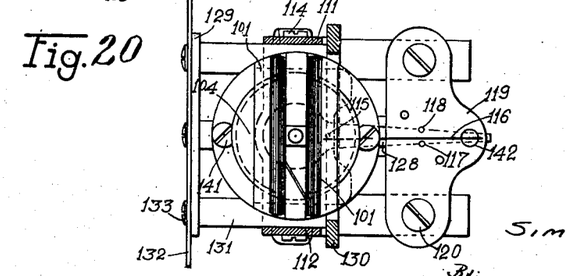
Figure 20 is a top view of Figure 18 along line XXIII—XXIII.

The clock shown in Figures 18 to 20 comprises a former 101 wound with copper wire and as indicated hereinafter, associated with the balance wheel 102. Said former and balance wheel are supported by the balance wheel shaft 103. The latter pivots, on one hand, on a cylindrical fixed magnet 104, housed inside the former 101, and, on the other hand, on a bridge 105. The cylindrical magnet 104 is supported by a shaft 106 going through a cross piece 107 and bearing on an adjustment screw 108. This shaft is held fixed by means of a clamping screw 109 engaging a transverse screw thread in the cross piece 107; the shaft 106 goes through the former 101 through a bore 110 having dimensions substantially larger than those of said shaft.

The magnetic field is closed by two side plates 111 and 112 and by the cross piece 107, used at the same time for the assembling of the chrono electrical movement, of the bridge 105 and of the pillars 113 fixed by screws 114 on said plates.

On the former 101 a finger 115 is secured, acting as a holder for an insulated contact which, at each half oscillation of the balance wheel, comes in contact with a blade 116 acting as a current reversal blade. Said blade 116 is put alternately in contact with change over contacts 117 and 118 mounted on a support 119 of insulating material attached by screws 120 to the pillars 113.

On shaft 103 lifts 123 are attached, for driving the clock movement proper, through a driving wheel 124. On this shaft is also secured a ring 125, used for the fixation of one end of a spiral spring 126 the other end of which is attached to a finger 127 associated with a regulating lever 128 used for the adjustment.

The whole of the purely mechanical movement of the clock is supported by a bridge 129 and a plate 130, the spacing of which is kept by the pillars 113 and 131. The dial 132 is attached on the bridge 129 by means of screws 133.

Figure 22:
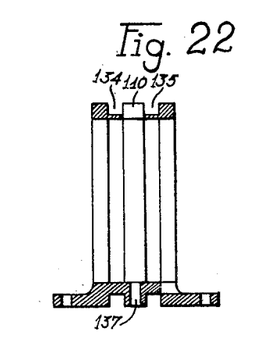
Figure 22 is an axial sectional view of the armature of the moving winding of the watch shown in Figure 18.
Figure 23:
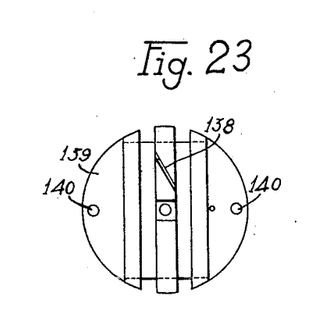
Figure 23 is a plan view of the armature of the moving coil shown in Figure 22.

As shown in Figures 22 and 23, the frame of the former 101 consists of a piece of insulating material capable of being easily moulded, such as a synthetic resin belonging, more especially, to the polyamid class or to the aceto-butyrate class, said frame comprising two grooves 134 and 135, located on both sides of a symmetry plane thereof. The central rib is provided with the aperture 110 for the passage of the shaft 105 and an aperture 137 for the passage of the shaft 103. It comprises further a transverse groove 138 for allowing the passage of the wound wire from groove 134 to groove 135. This frame is provided with a circular base 139 provided with holes 140 through which pass the screws 141 used for the fixation of said frame on the balance wheel 102, and which are respectively connected with the coil.

Figure 21:
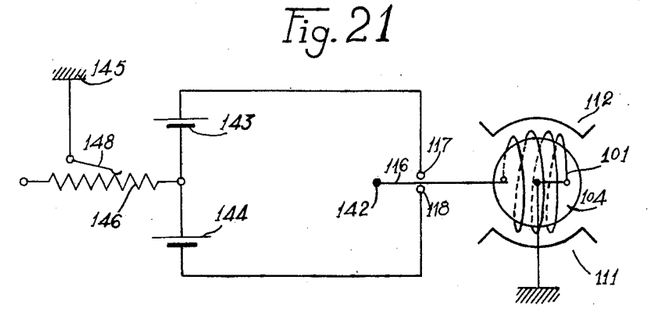
Figure 21 is a diagram of the supply circuit for the watch shown in Figure 18.

The power supply for the chrono-electrical movement is effected according to the diagram shown on Figure 17. The change over blade 117, however, instead of being mounted through a spiral spring on the change over switch support is mounted in a fixed piece 142 and operates only by flexure. Further, between the current sources 143 and 144 and the body terminal 145, a rheostat 146 is inserted, making it possible to compensate the wear of the generators 143 and 144, (Figure 21).

Figure 24:
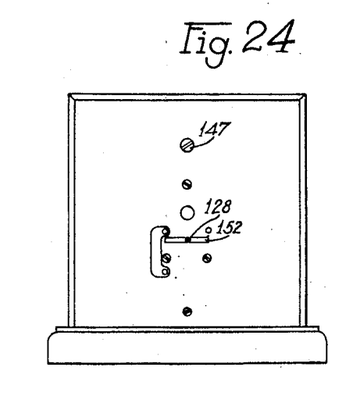
Figure 24 is a rear view of the watch illustrated in Figure 18 enclosed in its casing.
Figure 25:
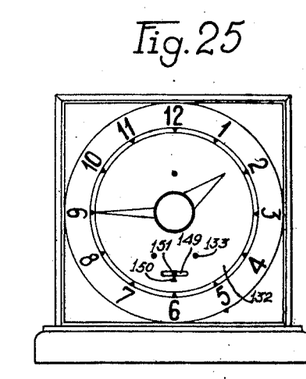
Figure 25 is a front view corresponding to Figure 24.

As shown in Figures 24 and 25, the adjustment of this isochronism may be effected through the button 147, used for the displacement of the movable element 148 of the rheostat 146, the variation of the action of the rheostat being directly visible on the dial 132 by means of a visual indicator 149 bearing an index 150, opposite which markings 151 on the balance wheel must stop at the end of each half oscillation. As usual, this adjustment may be perfected by acting on the regulating lever 128 which goes through a slot 152 provided on the rear face of the time piece.

The various modes of embodiment shown in Figures 26 to 33 are adapted to a type of supply in which the moving coil receives, at each passage through zero, a current of the same polarity which gives an impulse in one direction and one impulse in the other direction; the magnetic circuit is double, with a pole reversal on both sides of a neutral line which goes through the zero position of the balance wheel.

Thus, instead of causing two currents in opposite directions to alternate on both sides of the equilibrium position, the magnetic fields are inverted on both sides of said position. The coil is acted upon by two opposite torques which pass very rapidly from one side to the other of the neutral line. It is therefore sufficient for a motion to be started in one direction for the driving impulse to be produced in the same direction and to keep up the motion, provided the balance wheel is free upon its return. The contact is thus established on the neutral line, identical with the position of equilibrium of the balance wheel, and broken after a very small run to the right or to the left. This arrangement offers the advantage of making it possible to use a single contact and the whole of the coil winding and of the source voltage. The single contact consists of two elements, one carried by the balance wheel, the other one being fixed, one or the other of said elements or both being capable of flexing. It must be noted that with magnets separated at the pole reversal, the torques are only very slightly lower than those obtained with single magnets.

Figure 26:
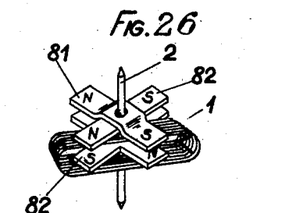
Figure 26 is a schematic perspective view of an electric movement wherein the magnetic circuit is a dual one, with interchanging of the poles for supplying the circuit with a current of the same polarity.

In the arrangement shown in Figure 26, the flat coil 1, associated with the pivoting pin 2 is housed in the air gap of two reversed magnets 81 and 82 associated with a magnetized core 83 with four pole pieces.

Figure 27:
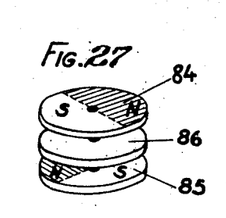
Figure 27 is a schematic perspective view of the magnetic elements of an electric movement with dual magnetic circuit similar to the embodiment shown in Fig. 5.

Figure 27 shows, schematically, the mounting of two magnets 84 and 85, in the shape of discs magnetized north-south on both sides of a diametral line, associated with a core 86 in the shape of a disc, constituted by a four pole magnet or a disc of saturated iron.

Figure 28:
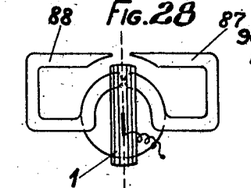
Figure 28 is a schematic plan view of an electric movement with dual magnetic circuit formed by two opposed U-shaped permanent magnets one part of which is surrounded by the winding.

In the realization shown in Figure 28, two magnets 87 and 88 with reversed poles act on the lateral sides of the coil 1.

Figure 29:
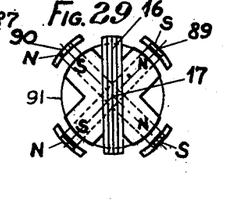
Figure 29 is a schematic cross-section of an electric cylindrical movement with dual magnetic circuit similar to the embodiment shown in Fig. 6.

Figure 29 shows, schematically a realization similar to that of Figure 6, for a clock designed to have the shape of a cylinder of small diameter, relatively elongated, wherein the coil 16 is movable about the pin 17 in the air gap of two reversed magnets 89 and 90 comprising a cylindrical core 91 made of saturated iron or a permanent magnet.

Figure 30:
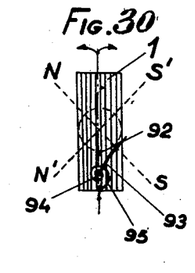
Figure 30 is a schematic side view of a winding movable in a dual magnetic circuit with its contact device.

In Figure 30, the single contact associated with the moving coil 1 comprises a pin 92, movable together with said coil with respect to the polar axes NS and N'S' and a blade 93 the point of articulation of which, 94, is fixed and which is associated with a spring 95 ensuring its return to the position of equilibrium.

Figure 31:
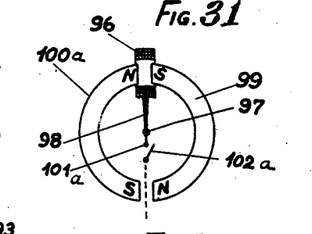
Figure 31 is a schematic plan view of an electric movement with dual magnetic circuit formed by two opposed semi-annular permanent magnets one part of which is surrounded by the winding.

In the realization shown in Figure 31, the coil 96 is articulated about the pin 97 by means of an arm 98. Said coil encircles two magnets 99 and 100, arranged along a half circle. The arm 98 carries an extension 101a which acts on the moving blade 102a connected with the current source.

Figure 32:
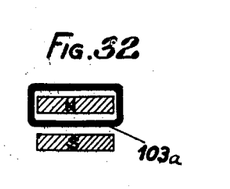
Figures 32 and 33 are respectively a cross-sectional view and a perspective view of an electric movement with dual magnetic circuit formed by two coaxial annular permanent magnets one of which is partially surrounded by the winding.
Figure 33:
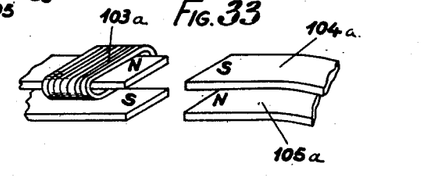

Figures 32 and 33 show, respectively in section and in perspective, an arrangement similar to that of Figure 31, wherein the moving coil 103a moves in the interval existing between the two inner and outer magnets 104a and 105a of circular shape and of rectangular section.

What constitutes the quality of the electric clock, according to the invention, and its good operation, is that the various arrangements described complete one another since they satisfy to the theorical conditions of the block-making industry: an instantaneous impulse at the point of equilibrium, and a complete freedom in the whole range of oscillation, under the action of the spring and mass, and no other action. They also satisfy to the practical conditions regarding life, (small consumption) and regarding the volume of the whole, and also the life of the contacts which cannot be damaged. The impulse is better than in the mechanical time piece where there is friction of the anchor on the lifts and a slight duration of the anchor action beyond the point of equilibrium.

What I claim is:

1. A movement for electric time pieces, such as clocks or watches with driving spiral balance wheel, of the kind having a fixed magnetic field generator formed by a permanent magnet device and a core managing with said permanent magnetic device a small air gap centered on the oscillation axis of the balance wheel, the magnetic flux generated by said permanent magnet device being closed through said core, a winding carried by the balance wheel, surrounding said core and oscillatable within said small gap, and a spiral spring one end of which is fixed whilst its other end is connected with said winding for applying a return torque to the winding-balance wheel assembly and for acting as current supplying element for said winding, comprising, in combination, means for supporting the core along the oscillation axis of the balance wheel for setting free the small air gap whereby the winding may oscillate for an angle substantially equal to 360°, means for energizing the winding during a determined fraction of the oscillation period thereof for each one of the half oscillations thereof, whereby for each complete oscillation period said winding receives two electrical impulses, means for directing each impulse in the corresponding oscillation direction of the winding-balance wheel assembly, and means for rendering negligible the variations of the flux traversing said winding when energized with respect to the flux traversing the same when de-energized, so that the inductive energy of said winding is substantially zeroized, whereby the sparks generated by the induction current at breaking are eliminated.

2. A movement for electric time pieces, according to claim 1, further comprising a means for regulating the amplitude of the balance wheel oscillations.

3. A movement for electric time pieces, according to claim 2, wherein the means for regulating the amplitude of the balance wheel oscillations comprises a rheostat traversed by the energizing current of the winding and having an adjusting movable element controlled from outside the time piece and a visual indicator for visually determining the amplitude of the oscillations according to the adjustment of said rheostat.

4. A movement for electric time pieces, according to claim 1, wherein the winding is supported by a frame surrounding the core and formed with two grooves located on both sides of a mid plane and with an upper and a lower central bore for supporting the shaft of the balance wheel, said grooves being connected together by a transverse slot for ensuring the continuity of the winding.

5. A movement for electric time pieces, according to claim 1, wherein the winding is supported by a frame made of insulating material.

6. A movement for electric time pieces, according to claim 5, wherein the frame is made of synthetic resin.

7. A movement for electric time pieces, according to claim 6 wherein the resin used is a resin of the polyamid class.

8. A movement for electric time pieces, according to claim 6 wherein the resin used is of the aceto-butyrate class.

9. A movement for electric time pieces, according to claim 1, wherein for rendering negligible the variations of the flux traversing the winding when energized and de-energized, the core consists of at least one magnet.

10. A movement for electric time pieces, according to claim 9, wherein each one of the magnets has a large coercive force and comprises agglomerated magnetic powder and an armature of a non-magnetic material, forming the supporting structure for said powder.

11. A movement for electric time pieces, according to claim 9, wherein each magnet consists of a washer magnetized north-south, on both sides of a diametral line.

12. A movement for electric time pieces, according to claim 9, wherein the field generator comprises two U-shaped magnets with closed magnetic circuits, shaped as circular sectors, two opposite poles of said magnets being located inside the winding, the two other poles being provided with pole pieces, the positions of which correspond to the equilibrium position of said winding, the magnetic flux having the same direction on both sides of the equilibrium position of the winding corresponding to the equilibrium position of the balance wheel.

13. A movement for electric time pieces, according to claim 9, wherein the field generator comprises at least one pair of reversed and crossed magnets with respect to the equilibrium position of the winding, and a magnetized four pole core, whereby the magnetic flux is reversed on both sides of said equilibrium position.

14. A movement for electric time pieces according to claim 9, wherein the field generator comprises two magnets having a general U-shape with reversed poles, located in one plane, said magnets having two opposite ends arranged along a circular arc centered on the balance wheel axis, the corresponding poles being located inside the winding when in equilibrium position, whereby the magnetic flux is reversed on both sides of said equilibrium position.

15. A movement for electric time pieces, according to claim 9, wherein the field generator comprises two inner and outer magnets having a cylindrical shape with opposite poles, centered on the balance wheel axis, the winding encircling one of said magnets and passing in the interval existing between said two magnets, and a support associated with the balance wheel shaft for supporting said winding, whereby the magnetic flux is reversed on both sides of the equilibrium position of said winding.

16. A movement for electric time pieces, according to claim 9, wherein the magnetic field generator is formed with respect to the winding with inner and outer elements as parts of a single magnet, the magnetic flux having the same direction on both sides of the equilibrium position of the winding.

17. A movement for electric time pieces, according to claim 16, wherein the single magnet is in the shape of a double semi-helix, the lower part of which is inside the winding, and the upper part of which is outside said winding, the latter part being provided with a pole piece.

18. A movement for electric time pieces, according to claim 16, wherein the single magnet consists of two circular magnets with reversed poles, centered on the axis of the balance wheel, and of cross pieces connecting said circular magnets together, the winding encircling one of said magnets in the interval thus provided being attached by one of its sides on the balance wheel pin.

19. A movement for electric time pieces, according to claim 9, wherein the field generator comprises two semi-circular magnets with opposite poles, said magnets being centered on the balance wheel axis and said poles being symmetrically located with respect to the equilibrium position of the winding, and a support associated with the balance wheel shaft for supporting said winding, said winding being mounted excentrically with respect to said axis for encircling said semi-circular magnets, whereby the magnetic flux is reversed on both sides of said equilibrium position.

20. A movement for electric time pieces, according to claim 1, wherein for rendering negligible the variations of the flux traversing the winding when energized and de-energized, the core is made of iron completely saturated for the magnetic field of the corresponding permanent magnet.

21. A movement for electric time pieces, according to claim 20, wherein the field generator comprises a U-shaped magnet having an upper flange and a lower flange, the latter being associated with a core made of iron completely saturated for the magnetic field of said magnet, the winding encircling said core and said lower flange and being attached by one of its ends on the shaft of the balance wheel, the magnetic flux having the same direction on both sides of the equilibrium position of the winding.

22. A movement for electric time pieces, according to claim 20, wherein the field generator comprises two magnets in the shape of discs magnetized north-south on both sides of a diametral line, said diametral lines being crossed with respect to the equilibrium position of the winding, and a core in the shape of a disc made of iron completely saturated for the magnetic field of said magnets and housed between the same, whereby the magnetic field is reversed on both sides of said equilibrium position.

23. A movement for electric time pieces, according to claim 1, wherein for rendering negligible the variations of the flux traversing the winding when energized and de-energized, the core is made of iron completely saturated for the magnetic field of the corresponding permanent magnet, such a saturation being reached only for the maximum field of the corresponding magnet.

24. A movement for electric time pieces, according to claim 1, wherein the fixed magnetic field generator generates a magnetic flux having the same direction on both sides of the equilibrium position of the winding corresponding to the equilibrium position of the balance wheel and wherein the means for energizing the winding and for directing the impulses comprise a small capacity current source, an open circuit for connecting when closed said source with said winding, and means for closing said circuit during the predetermined period fraction for each half oscillation of the balance wheel and for respectively supplying in succession said open circuit when closed with currents having different polarities for said both half oscillations.

25. A movement for electric time pieces, according to claim 24, wherein the winding comprises two reversed half windings, the common point of which is connected with one of the terminals of the current source, and wherein the closing means comprises two flexible contact blades attached to the terminals of said half windings, an insulating plate carried by said winding, inserted between said blades and positively protruding therefrom, and a contact finger, capable of pivoting, connected to the other terminal of the current source and placed in such a manner that said blades encounter it alternately at the time of the displacement of the winding in the direction of the passing of the balance wheel through its equilibrium position, and a spiral spring associated with said contact finger.

26. A movement for electric time pieces, according to claim 24, wherein one end of the winding is connected with two supply circuits symmetrically positioned with respect to the equilibrium position of said winding, the other end of said winding being connected with the mid point of a resistance element the ends of which are respectively connected with the poles of the current source, two flexible contact elements respectively connected with the terminals of said resistance elements and being respectively positioned so that each one contacts one of said supply circuits for the corresponding oscillation direction of the winding.

27. A movement for electric time pieces, according to claim 24, wherein one end of the winding is connected with two supply circuits symmetrically positioned with respect to the equilibrium position of said winding, the other end of said winding being connected with the mid point of the current source the poles of which are respectively connected with two flexible contact elements respectively positioned so that each one of said contact elements contacts one of said supply circuits for the corresponding oscillation direction of the winding.

28. A movement for electric time pieces, according to claim 24, wherein the open circuit and the closing means comprise a wire interconnecting the mid point of the current source and one end of the winding through the spiral spring, two blade contacts connected respectively with the poles of the source, a pivoting insulating plate inserted between said blades supporting the same and positively protruding outside them, a return spring associated with said plate, and a fixed piece mounted on the balance wheel and connected with the other end of said winding for the purpose of coming in contact alternately with one or the other of said blades, according to the direction of passage of the winding through its equilibrium position.

29. A movement for electric time pieces, according to claim 24, wherein the open circuit and the closing means comprise a wire interconnecting the mid-point of the current source and one end of the winding through the spiral spring, two fixed contacts respectively connected with the poles of the source, and a contact finger, capable of pivoting, connected with the other end of said winding and placed in such a manner that it alternately encounters said fixed contacts at the time of displacement of the winding in the direction of the passing of the balance wheel through its equilibrium position, and a spiral spring associated with said contact finger.

30. A movement for electric time pieces, according to claim 1, wherein the fixed magnetic field generator generates magnetic flux having reversed directions on both sides of the equilibrium position of the winding, and wherein the means for energizing the winding for directing the impulses comprise a small capacity current source, an open circuit for connecting when closed said source with said winding, and means for closing said circuit during the determined period fraction for each half oscillation of the balance wheel and for simultaneously supplying said open circuit when closed with currents having the same polarity.

31. A movement for electric time pieces, according to claim 30, wherein the open circuit and the closing means comprise a connection between one pole of the source and one end of the winding, and a two-part flexible contact device one part of which is connected with the other end of said winding while the other part is connected with the other pole of said source.

SIMON SERGE HELD.

REFERENCES CITED

The following references are of record in the file of this patent:

FOREIGN PATENTS

| Number | Country | Date |
|---|---|---|
| 410,732 | Great Britain | Aug. 18, 1932 |
| 461,183 | France | Oct. 23, 1913 |
| 501,215 | France | Jan. 19, 1920 |
| 526,211 | France | June 27, 1921 |
| 750,452 | France | May 29, 1933 |